United States Patent
Patil et al.

(10) Patent No.: US 11,343,178 B2
(45) Date of Patent: May 24, 2022

(54) NETWORK SERVICE HEADER (NSH) RELAYING OF SERVICEABILITY OF A SERVICE FUNCTION

(71) Applicant: Cisco Technology, Inc., San Jose, CA (US)

(72) Inventors: Prashanth Patil, Mountain View, CA (US); K Tirumaleswar Reddy, Bangalore (IN); Steven Richard Stites, Austin, TX (US); James N. Guichard, New Boston, NH (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/558,367

(22) Filed: Sep. 3, 2019

(65) Prior Publication Data
US 2020/0007438 A1 Jan. 2, 2020

Related U.S. Application Data

(62) Division of application No. 15/058,259, filed on Mar. 2, 2016, now abandoned.

(51) Int. Cl.
*H04L 45/64* (2022.01)
*H04L 45/302* (2022.01)
*H04L 12/46* (2006.01)
*H04L 47/31* (2022.01)
*H04L 47/11* (2022.01)

(52) U.S. Cl.
CPC ........ *H04L 45/306* (2013.01); *H04L 12/4633* (2013.01); *H04L 45/64* (2013.01); *H04L 47/115* (2013.01); *H04L 47/31* (2013.01)

(58) Field of Classification Search
CPC ...................................................... H04L 12/46
See application file for complete search history.

(56) References Cited

U.S. PATENT DOCUMENTS

| | | | |
|---|---|---|---|
| 8,442,133 B2 | 5/2013 | Kim et al. | |
| 9,621,520 B2 | 4/2017 | Quinn et al. | |
| 2009/0037713 A1 | 2/2009 | Khalid et al. | |
| 2013/0346593 A1 | 12/2013 | Setlur | |
| 2014/0362682 A1* | 12/2014 | Guichard | H04L 43/50 370/221 |
| 2015/0195197 A1 | 7/2015 | Yong et al. | |

(Continued)

OTHER PUBLICATIONS

Cisco, "GRE Tunnel Keepalives," Document ID: 118370, Dec. 17, 2014, 10 pages.

(Continued)

*Primary Examiner* — Sulaiman Nooristany
(74) *Attorney, Agent, or Firm* — Edell, Shapiro & Finnan, LLC (57) ABSTRACT

A network node in a service function chain system receives a peer detection packet from a service function device in a service function path. The peer detection packet includes an inner packet with a header, such as a network service header. The network node detects a status indicator in the header that indicates a degradation in performing a service function at the service function device. The network node adjusts the service function path to compensate for the degradation in performing the service function at the service function device.

14 Claims, 7 Drawing Sheets

(56) References Cited

U.S. PATENT DOCUMENTS

2017/0230198 A1 8/2017 Xu
2017/0257310 A1 9/2017 Patil et al.

OTHER PUBLICATIONS

Huang, et al., "A Traffic-Based Method of Detecting Dead Internet Key Exchange (IKE) Peers," The Internet Society, Network Working Group, Request for Comments: 3706, Informational, Feb. 2004, 13 pages.
J. Halpern, Ed. et al., "Service Function Chaining (SFC) Architecture", draft-ietf-sfc-architecture-07, Network Working Group, Internet-Draft, Intended status: Informational, Mar. 6, 2015, 28 pages.

* cited by examiner

NETWORK SERVICE HEADER (NSH) RELAYING OF SERVICEABILITY OF A SERVICE FUNCTION

CROSS REFERENCE TO RELATED APPLICATION

This application is a divisional of U.S. application Ser. No. 15/058,259, filed Mar. 2, 2016, the entirety of which is hereby incorporated by reference.

TECHNICAL FIELD

The present disclosure relates to applying service function chains in networks.

BACKGROUND

Service Function Chaining enables virtualized networking functions to be implemented as part of a cloud network. A Service Function Chain defines an ordered list of a plurality of service functions (e.g., firewall, compression, intrusion detection/prevention, load balancing, etc.) that may be applied to packet flows in the network. A flow enters the network through a classifier node that generates a Service Function Path for that flow according to the Service Function Chain policy. The classifier node encapsulates each packet of the flow with a Network Service Header that indicates the service functions to which the flow will be subjected, and the order the service functions will be applied.

Service Function Chaining and Network Service Headers provide a scalable, extensible, and standardized way of sharing metadata between both network nodes and service nodes within a network topology. This allows for disparate nodes that require shared context, but do not communicate directly, to share that context via metadata within the packets traversing the network or service topology.

DESCRIPTION OF EXAMPLE EMBODIMENTS

Overview

At a service function node configured to perform at least one service function on a data flow that follows a service function path, degradation in performing the service function is detected. The service function node generates a status indicator for the degradation in performing the service function and inserts the status indicator into a peer detection packet. The peer detection packet encapsulates an inner packet with a header that indicates the service function path. The service function node forwards the peer detection packet to a neighboring service function node along the service function path.

Example Embodiments

Service Function Chaining provides both metadata of a data flow and steers the flow to appropriate service functions. The Service Function Chaining encapsulation carries information that identifies a Service Function Path. The Service Function Path comprises an ordered list of service functions that act on the packets in the data flow. In one example, one or more service functions may be unavailable (e.g., the network path is broken) or overloaded (e.g., due to processing other traffic). To determine if the network path to the next service function is available, a service function may use ping-like messages, which operate at a low level. In one example, a Generic Routing Encapsulation (GRE) tunnel may use a GRE keepalive message exchange.

The techniques described herein provide for carrying additional information regarding the status of the service function beyond a mere link-level "ping" test. Network Service Headers, as defined by various Request for Comments published by the Internet Engineering Task Force (IETF) for example, are used to indicate the status of each service function, and a service function that receives a packet with a Network Service Header carrying this additional information may react appropriately, e.g., using a different Service Function Path or a different service function node.

Figure 1:
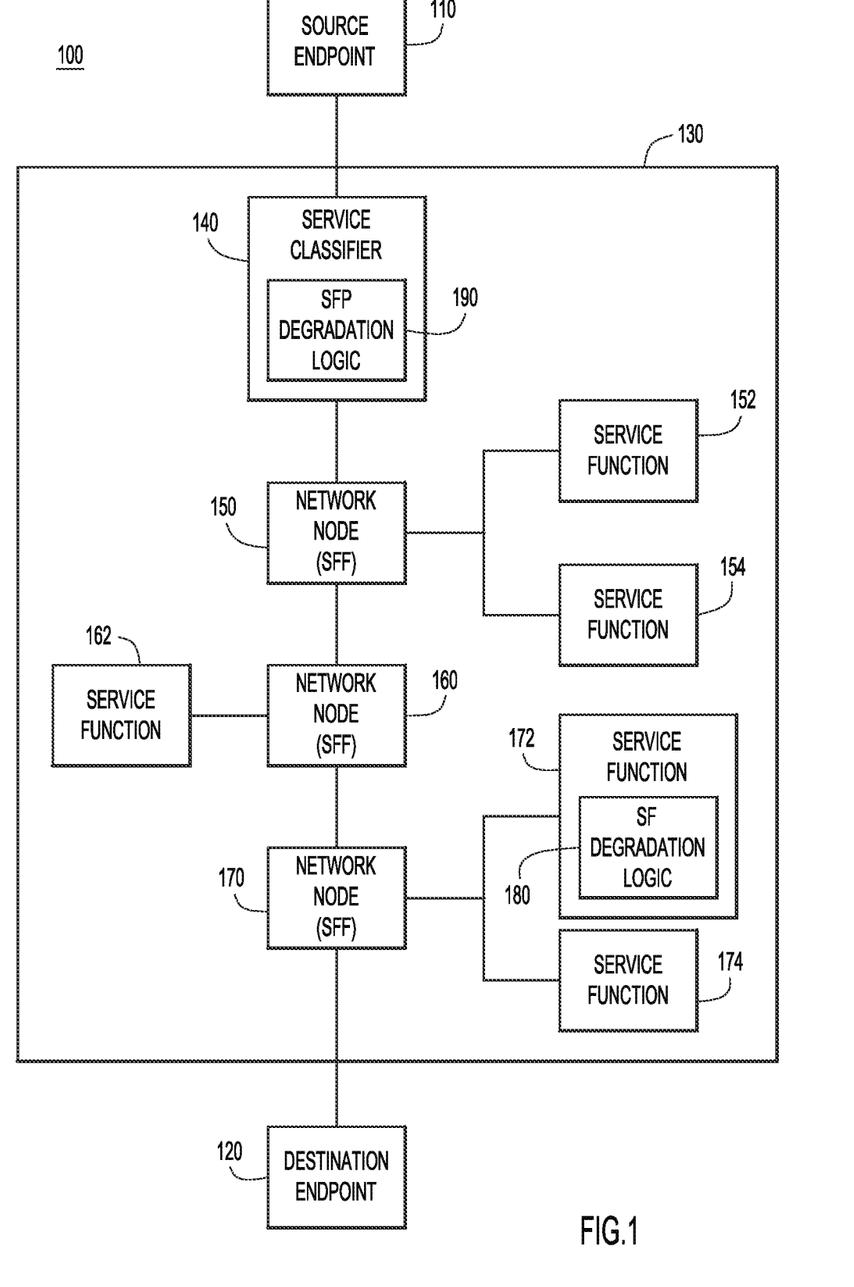
FIG. 1 is a system block diagram showing a Service Function Chain network environment with monitoring of the performance of service functions, according to an example embodiment.

Referring now to FIG. 1, a simplified block diagram of a data flow system 100 between two endpoint devices is shown. A source endpoint 110 sends a data flow to destination endpoint 120 through the Service Function Chain system 130. Endpoints 110 and/or 120 may include, for example, smart phones, tablets, laptop computers, desktop computers, virtual machine applications running in a datacenter, or other types of computing devices. Service Function Chain system 130 comprises a service classifier node 140, network devices (e.g., Service Function Forwarders) 150, 160, and 170. Network device 150 forwards packets in data flows to service functions 152 and 154. Network device 160 forwards packets in data flows to service function 162. Network device 170 forwards packets in data flows to service functions 172 and 174.

In one example, all of the service function nodes attached to one Service Function Forwarder, such as service functions 152 and 154 attached to network node 150, perform the same service function. The Service Function Forwarder may load balance performance of the service function by sending packets to a plurality of instances of the service function. Alternatively, the service function nodes attached to each Service Function Forwarder may provide different service functions. In another example, each Service Function Forwarder node handles all of the instances of a given service function in a Service Function Path. Alternatively, a service function may be repeated at different Service Function Forwarders, e.g., service function node 152 may perform the same service function as service function node 162.

Service function 172 includes service function (SF) degradation logic 180 to monitor the performance of the service function. Other service functions in addition to the service function 172 may also include service function degradation logic to monitor their respective performance. Service classifier 140 includes Service Function Path degradation logic 190 to determine the performance of the service functions in a particular Service Function Path and handle any degradation in performance. In one example, degradation in performance of a service function may include a complete failure of a service function node such that the service function cannot perform any tasks on any data flows. Alternatively, degradation in performance of the service function may include processing the data flows with the service function more slowly than expected such that a bottleneck at the degraded service function slows the data flow throughout the entire Service Function Path.

In the example shown in FIG. 1, the Service Function Chain system 130 is shown with one service classifier, three Service Function Forwarder (SFF) network nodes, and five service function nodes, but the techniques presented herein may be applied to Service Function Chaining systems with any number of SFF network nodes and any number of service functions. Additional network elements, either inside the Service Function Chain system 130 or outside of the system 130 may also be included to transmit the flows between source endpoint 110 and destination endpoint 120. Additional service classifiers may also be included in the Service Function Chain system 130, e.g., to handle return data flows from the destination endpoint 120 to the source endpoint 110. In another example, one or more of the nodes in the Service Function Chain system 130 may be physical devices or virtual machines running in a data center.

Dead peer detection involves an exchange of low-level packets between two nodes, i.e., peer nodes, to detect whether the nodes remain in communication with each other. Peer nodes may include two service function nodes that perform neighboring service functions in the Service Function Path. The service classifier and the service function node performing the first service function may also be peer nodes. In one example, peer nodes in a Service Function Path use GRE keepalive messages for dead peer detection. Alternatively, peer nodes may use an Internet Security Association and Key Management Protocol (ISAKMP) message exchange of an R-U-THERE message and an R-U-THERE-ACK response. In general, the low-level packet exchange by peer nodes will be referred to hereinafter as peer detection messages, peer detection requests, and peer detection responses.

If the service function node 172 is unable to perform its service function(s) or is overloaded in capacity, then the service function degradation logic 180 will add metadata to the Network Service Header in a peer detection message. The metadata may include a status indicator that allows the service function node 172 to indicate its current status. In one example, the status indicator may be similar to Hypertext Transfer Protocol (HTTP) response codes, i.e., 1xx for informational codes, 2xx for success codes, 3xx for redirection codes, 4xx for client error codes, and 5xx for server error codes. Sub-codes within the code classes may provide further information describing the status of the service function node 172. In another example, the Network Service Header may be integrity protected and encrypted to ensure that the status indicator carried in the metadata of the Network Service Header is not compromised.

The peer detection message is received by a neighboring peer node, such as the previous service function node 162 in the Service Function Path. Additionally, Service Function Forwarder 170 and/or Service Function Forwarder 160 may receive the peer detection message with the status indicator. The Network Service Header may include additional information, such as statistical information on the performance of the service function node 172. The Service Function Forwarders may use this statistical information to make an informed load distribution decision among the instances of the same service function. Any node that receives a status indicator that a service function node is not able to perform adequately will ensure that existing flows are unaffected, especially if the service functions in the Service Function Path are stateful. Redirection to a new service function node or an alternative Service Function path will typically only be relevant for subsequent flows.

In another example, the service function node 172 may insert the status indicator into the Network Service Header metadata of a peer detection response. Alternatively, the service function node 172 may send the status indicator in its own peer detection request, particularly if the service function node 172 wants to immediately notify that it can no longer service packets. This peer detection request may be sent multiple times to handle packet loss and ensure that the status indicator is received by the peer node.

Figure 2:
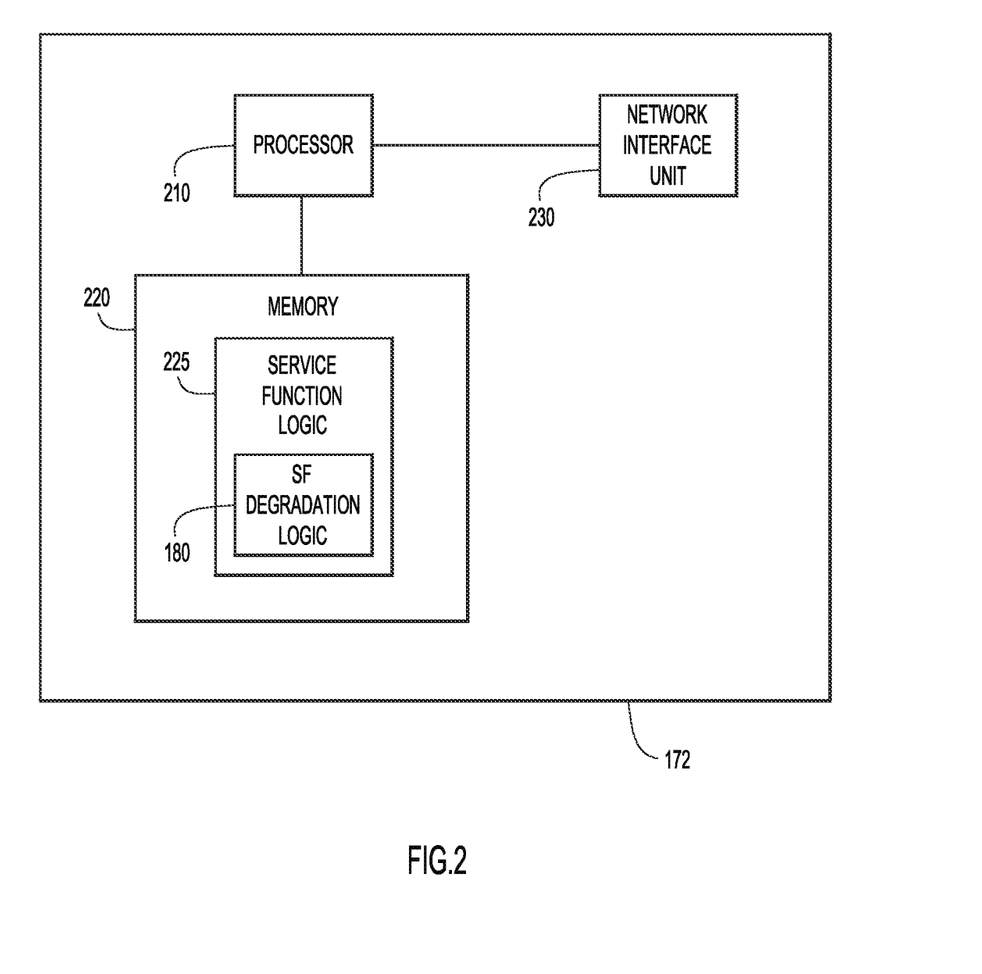
FIG. 2 is a simplified block diagram of a service function device within the Service Function Chain network environment, according to an example embodiment.

Referring now to FIG. 2, a simplified block diagram is shown of a service function node 172 configured to perform a service function. Service function node 172 includes, among other possible components, a processor 210 to process instructions relevant to processing packets in data flow, and memory 220 to store a variety of data and software instructions (e.g., service function logic 225, service function degradation logic 180, etc.) The service function node 172 further includes a network interface unit 230 configured to communicate with other computing devices over a computer network.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (e.g., by the processor 210) it is operable to perform the operations described herein.

It is to be understood that the service function node 172 may be a physical device or a virtual (software) device. In the latter case, the service function node 172 is embodied as software running on a computer node (e.g., in a datacenter or other environment) through which traffic is directed and for which determinations are made as to how packets are to be routed into a Service Function Chain.

Figure 3:
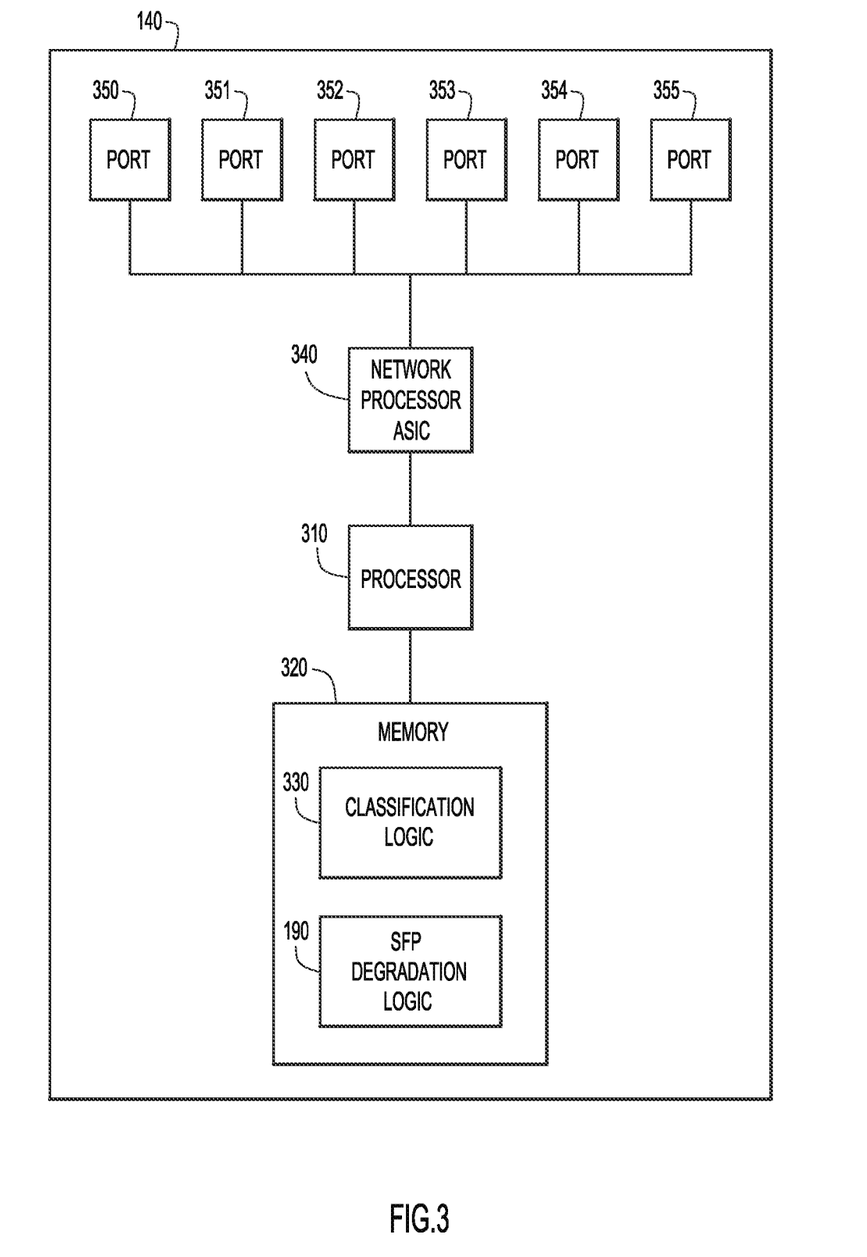
FIG. 3 is a simplified block diagram of a classifier network element within the Service Function Chain network environment, according to an example embodiment.

Referring now to FIG. 3, a simplified block diagram is shown of a classifier network device 140 configured to perform the techniques of a classifier node. Classifier 140 includes, among other possible components, a processor 310 to process instructions relevant to processing communication packets for a Service Function Chain system, and memory 320 to store a variety of data and software instructions (e.g., Classification logic 330, Service Function Path degradation logic 190, communication packets, etc.). The classifier 140 also includes a network processor application specific integrated circuit (ASIC) 340 to process communication packets that flow through the classifier device 140. Network processor ASIC 340 processes communication packets be sent to and received from ports 350, 351, 352, 353, 354, and 355. While only six ports are shown in this example, any number of ports may be included in classifier device 140.

Memory 320 may include read only memory (ROM), random access memory (RAM), magnetic disk storage media devices, optical storage media devices, flash memory devices, electrical, optical, or other physical/tangible (e.g., non-transitory) memory storage devices. The processor 310 is, for example, a microprocessor or microcontroller that executes instructions for implementing the processes described herein. Thus, in general, the memory 320 may comprise one or more tangible (non-transitory) computer readable storage media (e.g., a memory device) encoded with software comprising computer executable instructions and when the software is executed (e.g., by the processor 310) it is operable to perform the operations described herein.

It is to be understood that the classifier network device 140 may be a physical device or a virtual (software) device. In the latter case, the classifier network device 140 is embodied as software running on a compute node (e.g., in a datacenter or other environment) through which traffic is directed and for which determinations are made as to how packets are to be routed into a Service Function Chain.

Figure 4:
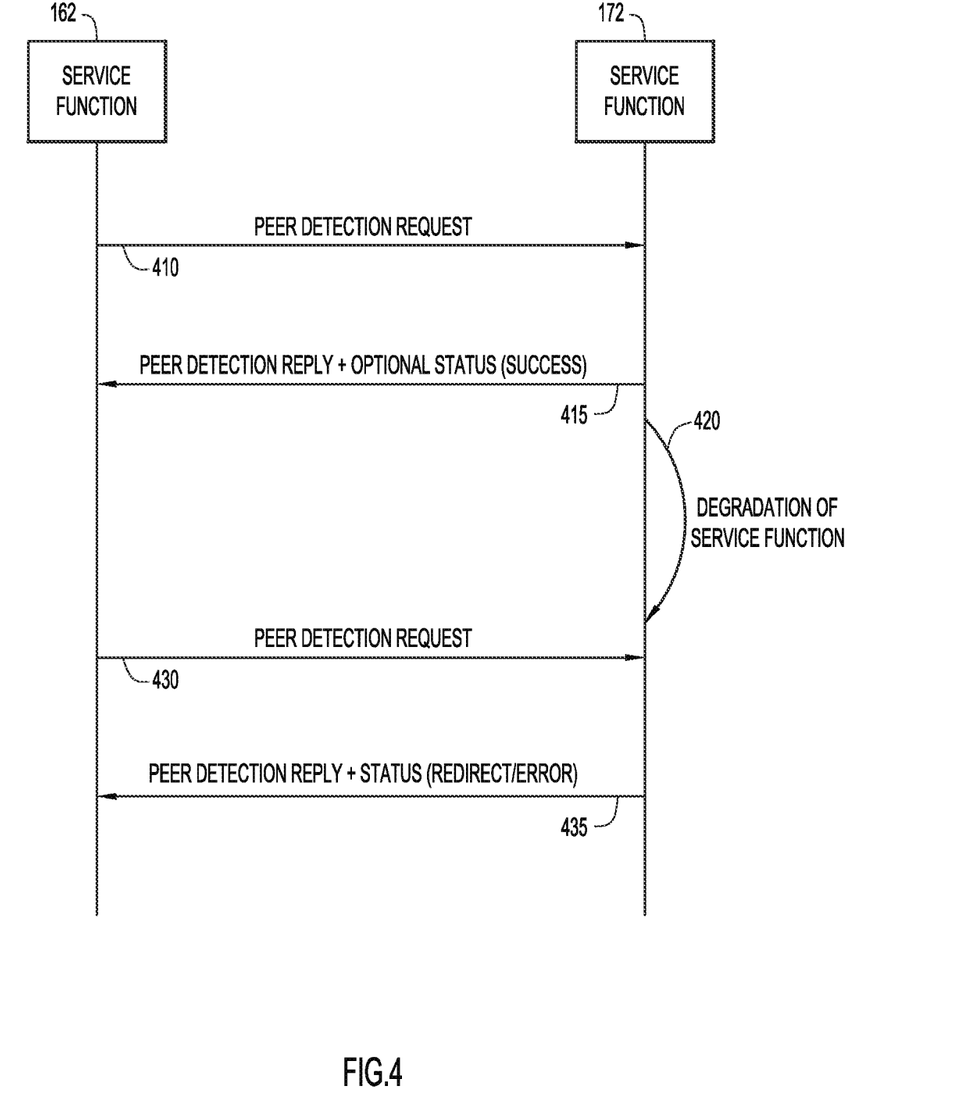
FIG. 4 is a ladder diagram that shows messages passed between peer service function nodes when the performance of one of the service functions is compromised, according to an example embodiment.

Referring now to FIG. 4, a ladder diagram is shown of peer service function nodes 162 and 172 exchanging peer detection messages with status indicators. Service function node 162 initiates a peer detection exchange with service function node 172 by sending peer detection request message 410. The peer detection reply 415 may include a status indicator which indicates that the service function node 172 is successfully performing the service function at the time that message 415 is sent.

The performance of the service function in service function node 172 starts to be degraded at 420. The degradation may be, for example, a slowdown in the processing of packets with the service function. Alternatively, the degradation may be a total inability of the service function node 172 to perform the service function. In response to the next peer detection request 430 from the peer service function node 162, the service function node 172 sends a peer detection reply 435 with a status indicator. In one example, the status indicator is included in metadata of the Network Service Header of the peer detection reply 435, and indicates the degradation in the performance of the service function at service function node 172.

Figure 5:
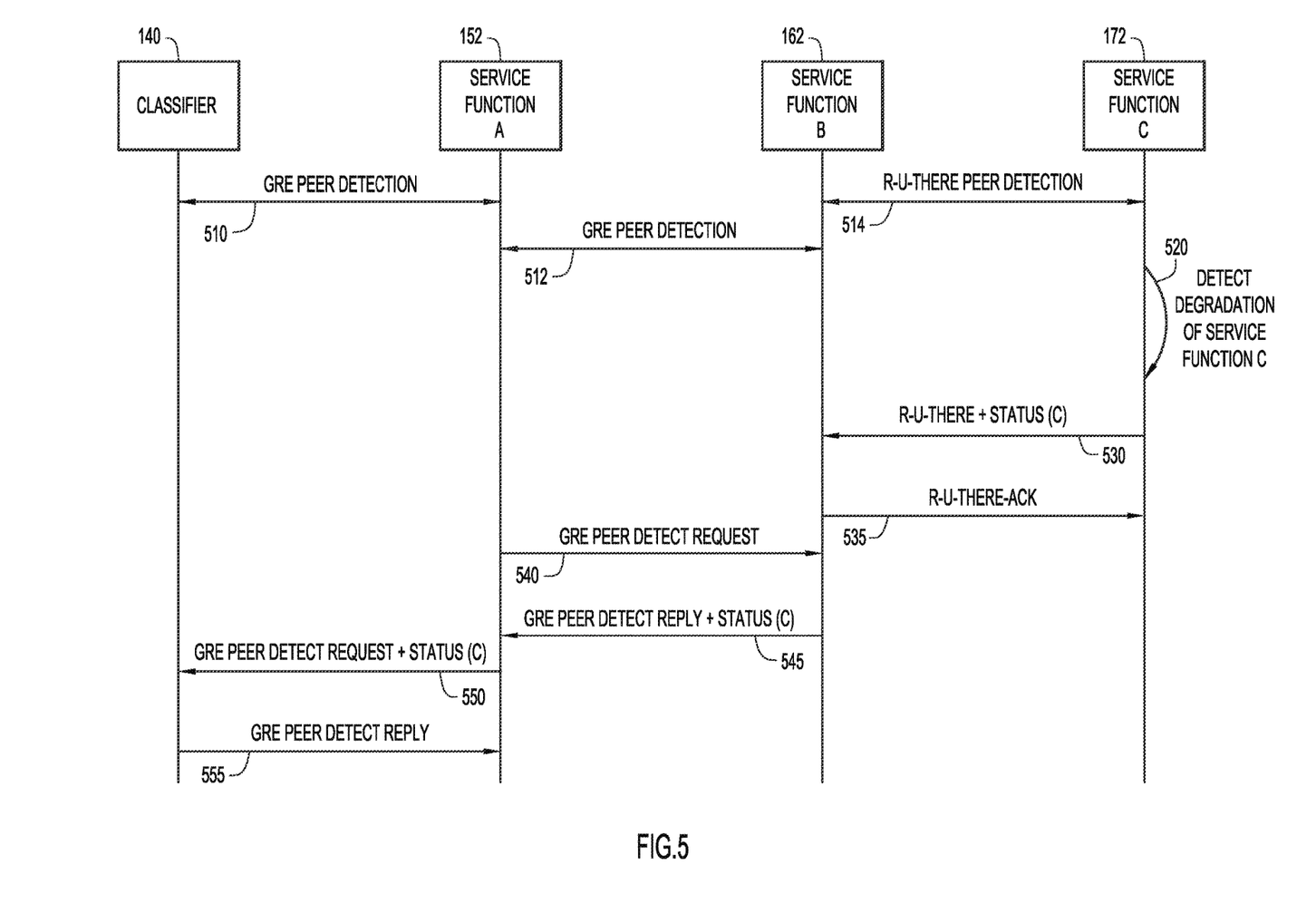
FIG. 5 is a ladder diagram that shows messages passed between nodes in a service function chain when the performance of one of the service functions is compromised, according to an example embodiment.

Referring now to FIG. 5, a ladder diagram of peer detection messages exchanged between peers along an entire Service Function Path is shown. In this example, The Service Function Path includes service functions A, B, and C. Packets in this Service Function Path start at the classifier 140 and proceed to service function A performed at service function node 152. After service function node 152, the packets continue to service function B performed at service function node 162 and service function C performed at service function node 172. After a service function degradation is detected, that information is propagated throughout the Service Function Path to ensure that each node can take the most appropriate action in resolving the degradation. Since the mode of encapsulation of the peer detection messages may vary between peers, the status indicator may be propagated throughout the Service Function Path using different formats. In the example of FIG. 5, the status indicator is converted from an R-U-THERE exchange to a GRE keepalive exchange.

In normal operation, the classifier 140 and the service function node 152 are peer nodes that detect each other through a GRE peer detection exchange 510. The service function node 152 and service function node 162 are peer nodes that detect each other through GRE peer detection exchange 512. The service function node 162 and service function node 172 are peer nodes that detect each other through an R-U-THERE message exchange 514. The peer detection exchanges 510 and 512 are in a different format than peer detection exchange 514, and are typically independent exchanges of low level peer detection request and response messages. The peer detection exchanges 510, 512, and 514 may be repeated at intervals to allow each node to detect neighboring nodes.

The performance of the service function C in service function node 172 starts to be degraded at 520. The service function node 172 sends an R-U-THERE message 530 to the service function node 162 and includes a status indicator in the metadata of the Network Service Header in the R-U-THERE message 530. The status indicator indicates that service function C is degraded at service function node 172. The service function node 162 responds with an R-U-THERE-ACK response message 535 to complete the peer detection exchange. In another example, the service function node 162 may initiate the R-U-THERE peer detection exchange instead of service function node 172. In this case, the service function node 172 will include the status indicator in the R-U-THERE-ACK message.

The service function node 162 propagates the status information back up the Service Function Path to ensure that the most appropriate action is taken by each node in the Service Function Path. In response to the next GRE peer detection request 540 by the service function node 152, i.e., the previous node in the Service Function Path, the service function node 162 inserts a status indicator into the metadata of the Network Service Header of GRE peer detection reply message 545. The status indicator indicates that the service function C is degraded at the service function node 172. In another example, the service function node 162 may not wait for the service function node 152 to initiate the GRE keepalive exchange and may send its own GRE keepalive message with the status indicator.

The service function node 152 propagates the status information up the Service Function Path by sending a GRE peer detection request 550 to the service classifier node 140. The GRE peer detection request 550 includes in a Network Service Header the status indicator that indicates that service function C is degraded at service function node 172. The service classifier 140 completes the GRE peer detection exchange with reply message 555. In another example, the service function node 152 may wait for the service classifier 140 to initiate the GRE keepalive peer detection exchange. In this case, the service function node 152 will insert the status indicator into the GRE peer detection reply message.

While the description of FIG. 5 focuses on GRE and R-U-THERE (e.g., Internet Protocol Security (IPSec)) peer detection encapsulation mechanisms, other modes of encapsulation (e.g., Virtual Extensible Local Area Network—Generic Protocol Extension (VxLAN-gpe), Ethernet, etc.) may be used to relay the status of a service function in the Network Service Header. In the context of Cloud Web Security, the techniques presented may be used to relay serviceability of service functions. In one example of Cloud Web Security, GRE or IPSec is used to transport the Network Service Header from a connector to the cloud network. The Cloud Web Security service may relay its status back to the connector. The connector may continue to tunnel into a specified Cloud Web Security data center as long as the Cloud Web Security service is functioning. The connector may switch to a suggested alternative data center if it receives a redirection status indicator from the primary data center. In one example, the address of the alternative data center may be included in the redirection status from the primary data center. Alternatively, the connector may switch to a predetermined secondary data center if the Cloud Web Security service returns an error status indicator.

Figure 6:
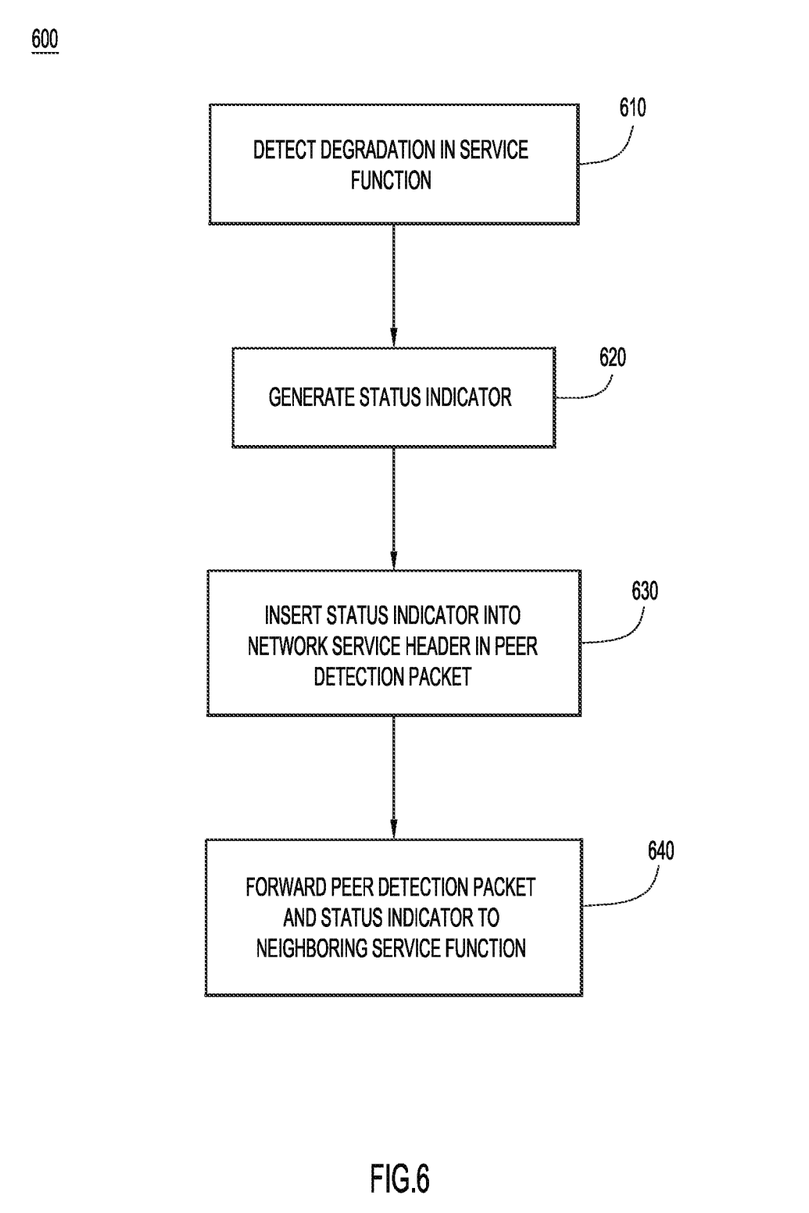
FIG. 6 is a flowchart showing the operations of a service function node that suffers from degradation in its ability to perform the service function, according to an example embodiment.

Referring now to FIG. 6, a flowchart is shown for a process 600 by which a service function node notifies a peer node of a degradation in the performance of a service function. In step 610, the service function node detects degradation in a service function (e.g., a partial or complete inability to process packets in a timely manner) at the node. The service function node generates a status indicator that describes the degradation in step 620. In step 630, the service function node inserts the status indicator into metadata of a Network Service Header in a peer detection packet. The peer detection packet may be a GRE keepalive message or a response to a GRE keepalive message from a peer node. In step 640, the service function node forwards the peer detection packet with the status indicator to a neighboring service function node. The neighboring service function node, i.e., a peer node, may be the initiator or the responder in a GRE keepalive exchange.

In one example, the peer detection packet encapsulates an inner packet including the Network Service Header. The Network Service Header will typically be used to encapsulate a payload for the Service Function Chaining system and includes an indication of the particular Service Function Path for the payload.

Figure 7:
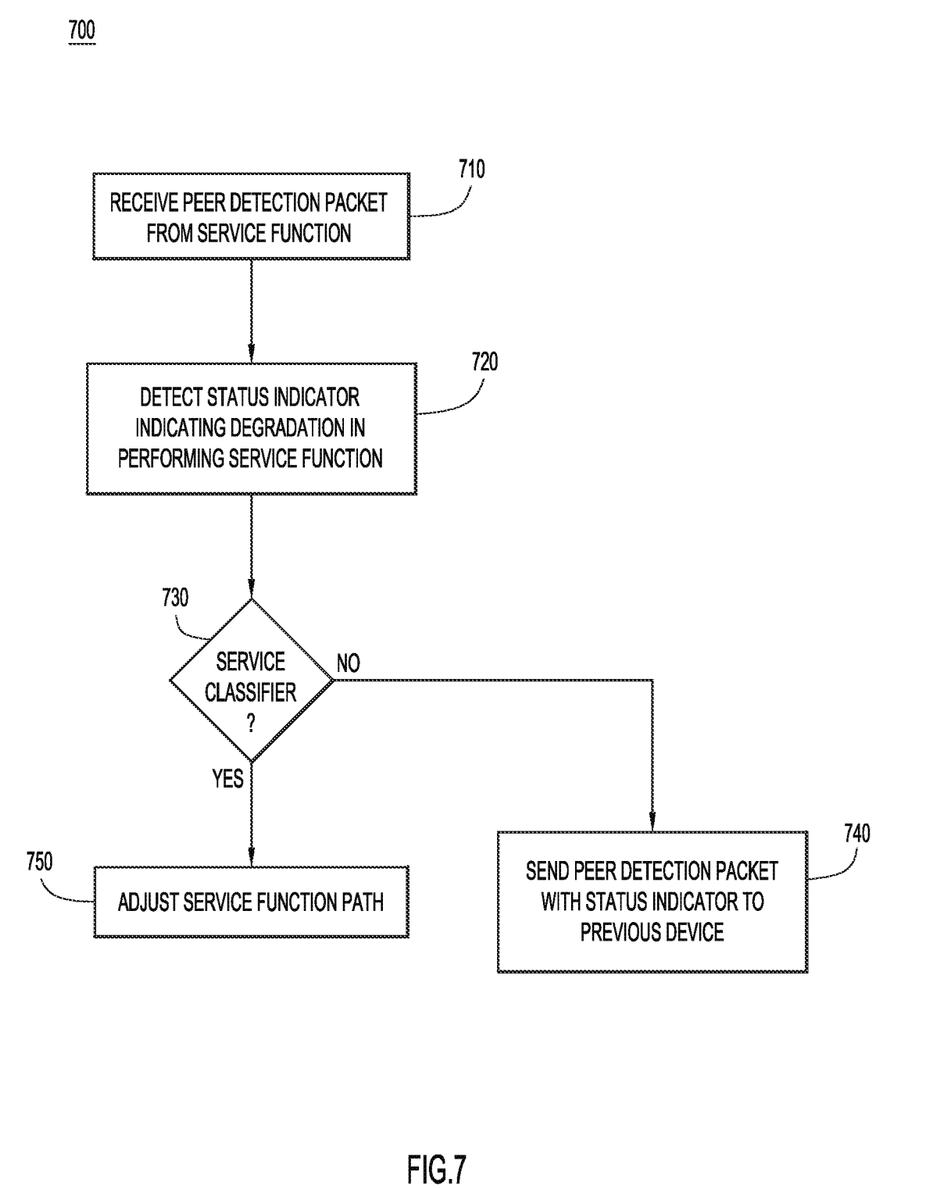
FIG. 7 is a flowchart showing the operations of a node in a service function path when another node is degraded in its ability to perform a service function, according to an example embodiment.

Referring now to FIG. 7, a flowchart is shown for a process 700 by which a peer node receives a status indicator of a degraded service function and reacts to the status indicator appropriately. In step 710, a peer node receives a peer detection packet from a service function node. In step 720, the peer node detects a status indicator indicating that the performance of a service function at a service function node is degraded. In one example, the service function node with degraded performance may be the peer service function node from which the peer detection packet was received. Alternatively, the service function node with degraded performance may be further down the Service Function Path.

If the peer node is not the service classifier for the Service Function Path, as determined in step 730, then the peer node propagates the status of the degraded service function to a previous node in the Service Function Path, e.g., in another peer detection message, in step 740. If the peer node is the service classifier, then the peer node/service classifier adjusts the Service Function Path in step 750. In one example, the service classifier may adjust the Service Function Path by directing subsequent packets in the data flow to a second Service Function Path that does not include degraded service function node.

In summary, the techniques presented herein provide for a mechanism to convey the status of a service function using the Network Service Header of a peer detection message. A service function node that receives a Network Service Header with this status information may then react appropriately, e.g., by altering the Service Function Path, or by picking an alternative service function node to provide the service function. In this way, the liveliness of the service function nodes will be detected. Additionally, the Network Service Header metadata may convey the service function node liveliness to the service classifier, which may change the Service Function Path. Further, the Network Service Header metadata may convey the service function node liveliness to a Service Function Forwarder, which may forward data to a different instance of the service function at a different service function node. In these examples, the status of a service function may be relayed within the data plane without any need for a separate control plane.

In one form, the techniques presented herein provide for a computer-implemented method performed at a service function node in a Service Function Path. At a network device or a computing device configured to perform at least one service function on a data flow that follows a service function path, the method comprises detecting degradation in performing the service function. The method further comprises generating a status indicator for the degradation in performing the service function and inserting the status indicator into a peer detection packet. The peer detection packet encapsulates an inner packet with a network service header that indicates the service function path. The computing device forwards the peer detection packet to a neighboring service function device along the service function path.

In another form, the techniques presented herein provide for an apparatus comprising a network interface unit and a processor. The network interface unit is configured to communicate with a plurality of (physical or virtual) service function devices in a service function path. The processor is configured to perform at least one service function on a data flow that follows the service function path. The processor is configured to detect degradation in performing the service function and generate a status indicator for the degradation in performing the service function. The processor is further configured to insert the status indicator into a peer detection packet that encapsulates an inner packet. The inner packet includes a network service header that indicates the service function path. The processor is configured to cause the network interface unit to forward the peer detection packet to a neighboring service function along the service function path.

In yet another form, the techniques presented herein provide for a computer-implemented method performed at a peer node in a Service Function Path. The method comprises receiving a peer detection packet from a (physical or virtual) service function device in the Service Function Path. The peer detection packet comprises an inner packet with a network service header. The method further comprises detecting a status indicator in the network service header. The status indicator indicates degradation in performing a service function at the service function device. The method also comprises adjusting the service function path to compensate for the degradation in performing the service function at the service function device.

In still another form, a non-transitory computer readable storage media is provided that is encoded with instructions that, when executed by a processor, cause the processor to perform any of the methods described and shown herein.

The above description is intended by way of example only. Various modifications and structural changes may be made therein without departing from the scope of the concepts described herein and within the scope and range of equivalents of the claims.

What is claimed is:

1. A method comprising:
at a network node connected to a service function device, forwarding at least one data flow in a service function path to the service function device, the service function path defining an ordered list of service functions, wherein the service function device performs a service function from the ordered list of service functions;
at the network node between the service function device and a peer device in the service function path, forwarding a peer detection exchange between the service function device and the peer device, wherein the peer device is another service function device that performs a neighboring service function in the ordered list of service functions;
detecting a status indicator in a header of a peer detection message in the peer detection exchange between the service function device and the peer device, the status indicator indicating to the network node a degradation in performing the service function at the service function device;
determining a different service function device based on service function statistical information in the header; and
adjusting the service function path to compensate for the degradation in performing the service function at the service function device by providing the service function from the different service function device.

2. The method of claim 1, wherein the status indicator is detected as metadata in a network service header.

3. The method of claim 1, wherein the status indicator indicates one or more of a success status, a redirection status, or a server error status.

4. The method of claim 3, further comprising:
responsive to the status indicator indicating a redirection status, adjusting the service function path by redirecting future data flows to an alternative data center as indicated in the redirection status; and
responsive to the status indicator indicating a server error status, adjusting the service function path by redirecting the future data flows to a predetermined secondary data center.

5. The method of claim 1, wherein adjusting the service function path comprises sending a new peer detection packet to a previous device in the service function path.

6. The method of claim 5, wherein the previous device is a previous service function device, a service function classifier device, or service function forwarder device.

7. The method of claim 1, wherein adjusting the service function path comprises classifying a data flow into a new service function path that avoids the service function device.

8. An apparatus comprising:
a network interface configured to:
forward at least one data flow in a service function path to a service function device that is connected to the network interface, the service function path defining an ordered list of service functions, wherein the service function device performs a service function from the ordered list of service functions; and
forward a peer detection exchange between the service function device and a peer device in the service function path, wherein the peer device is another service function device that performs a neighboring service function in the ordered list of service functions; and
a processor configured to:
detect a status indicator in a header of a peer detection message in the peer detection exchange between the service function device and the peer device, the status indicator indicating to the processor, a degradation in performing the service function at the service function device;
determine a different service function device based on service function statistical information in the header; and
adjust the service function path to compensate for the degradation in performing the service function at the service function device by providing the service function from the different service function device.

9. The apparatus of claim 8, wherein the processor is configured to detect the status indicator as metadata in a network service header.

10. The apparatus of claim 8, wherein the status indicator indicates one or more of a success status, a redirection status, or a server error status.

11. The apparatus of claim 8, wherein the processor is configured to adjust the service function path by classifying a data flow into a new service function path that avoids the service function device.

12. One or more non-transitory computer readable storage media encoded with software comprising computer executable instructions and, when the software is executed by a processor on a network node, operable to cause the processor to:
forward at least one data flow in a service function path to a service function device, the service function path defining an ordered list of service functions, wherein the service function device performs a service function from the ordered list of service functions;
forward a peer detection exchange between the service function device and a peer device in the service function path, wherein the peer device is another service function device that performs a neighboring service function in the ordered list of service functions;
detect a status indicator in a header of a peer detection message in the peer detection exchange between the service function device and the peer device, the status indicator indicating a degradation in performing the service function at the service function device;
determine a different service function device based on service function statistical information in the header; and
adjust the service function path to compensate for the degradation in performing the service function at the service function device by providing the service function from the different service function device.

13. The non-transitory computer readable storage media of claim 12, further comprising instructions operable to cause the processor to detect the status indicator as metadata in a network service header.

14. The non-transitory computer readable storage media of claim 12, further comprising instructions operable to cause the processor to adjust the service function path by classifying a data flow into a new service function path that avoids the service function device.

* * * * *